United States Patent
Aharoni et al.

(10) Patent No.: US 8,438,425 B1
(45) Date of Patent: May 7, 2013

(54) TESTING A DEVICE FOR USE IN A STORAGE AREA NETWORK

(75) Inventors: Yuval Aharoni, Kfar Sava (IL); Saar Cohen, Moshav Mishmeret (IL); Nir Goldschmidt, Herzelia (IL)

(73) Assignee: EMC (Benelux) B.V., S.A.R.L., Luxembourg (LU)

( * ) Notice: Subject to any disclaimer, the term of this patent is extended or adjusted under 35 U.S.C. 154(b) by 1531 days.

(21) Appl. No.: 11/964,224

(22) Filed: Dec. 26, 2007

(51) Int. Cl.
G06F 11/267 (2006.01)

(52) U.S. Cl.
USPC .................. 714/43; 714/25; 714/28; 714/32; 714/40

(58) Field of Classification Search ............. 714/29, 714/28, 43
See application file for complete search history.

(56) References Cited

U.S. PATENT DOCUMENTS

| | | | | |
|---|---|---|---|---|
| 7,124,324 B1 * | 10/2006 | Au | | 714/29 |
| 2002/0129230 A1 * | 9/2002 | Albright et al. | | 713/1 |
| 2003/0067656 A1 * | 4/2003 | Gentile | | 359/158 |
| 2003/0208710 A1 * | 11/2003 | Martin-de-Nicolas et al. | | 714/736 |
| 2003/0212785 A1 * | 11/2003 | Jibbe | | 709/224 |
| 2004/0254777 A1 * | 12/2004 | Foreman et al. | | 703/21 |
| 2005/0005031 A1 * | 1/2005 | Gordy et al. | | 709/250 |
| 2005/0050205 A1 * | 3/2005 | Gordy et al. | | 709/227 |
| 2005/0129033 A1 * | 6/2005 | Gordy et al. | | 370/401 |
| 2005/0232285 A1 * | 10/2005 | Terrell et al. | | 370/401 |
| 2006/0106819 A1 * | 5/2006 | Dhanadevan et al. | | 707/100 |
| 2006/0212540 A1 * | 9/2006 | Chon et al. | | 709/218 |
| 2007/0002755 A1 * | 1/2007 | Matityahu et al. | | 370/242 |
| 2007/0109002 A1 * | 5/2007 | Wu et al. | | 324/755 |
| 2008/0089320 A1 * | 4/2008 | Dehaan et al. | | 370/360 |
| 2008/0181119 A1 * | 7/2008 | Beyers | | 370/241 |
| 2009/0070092 A1 * | 3/2009 | Dickens et al. | | 703/21 |
| 2010/0131581 A1 * | 5/2010 | Jibbe et al. | | 709/201 |

* cited by examiner

*Primary Examiner* — Chae Ko
(74) *Attorney, Agent, or Firm* — Daly, Crawford, Mofford & Durkee, LLP (57) ABSTRACT

In one aspect, a method of testing a device for use in a storage area network (SAN) system includes receiving recorded messages including messages from a host and from a storage array and messages to a host and to a storage array, sending the recorded messages from the host and the storage array to a device under test, receiving messages from the device under test in response to the recorded messages sent and determining whether the device under test functions identically to a validated device based on the messages from the device under test being substantially identical to the recorded messages.

20 Claims, 6 Drawing Sheets

TESTING A DEVICE FOR USE IN A STORAGE AREA NETWORK

BACKGROUND

Figure 1:
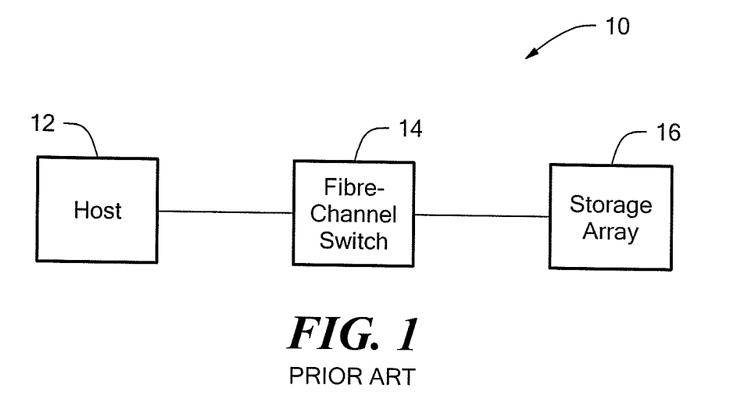
FIG. 1 is a simplified diagram of an example of a prior art storage area network.

Referring to FIG. 1, a conventional storage area network (SAN) 10 includes one or more hosts (e.g., a host 12) connected to one or more storage arrays (e.g., a storage array 16) by a channel (e.g., a fibre channel switch 14). The host 12 accesses the storage array 16 by sending input/output (IO) transactions such as read commands to read data from the storage array or as write commands to write data to the storage array. When the host 12 sends data to be written to the storage array 16, the storage array generally sends an acknowledgment message to the host that the data was successfully written to the storage array or sends an error message that an error has occurred. When the host 12 sends a request to read data from the storage array 16, the storage array responds by providing the data to the host.

In general, the exchange of information between the host 12 and the storage area 16 follows, for example, a Small Computer System Interface (SCSI) protocol, which is a communication protocol. Hosts and storage arrays in the SAN 10 may be fabricated by different vendors. In one example, one vendor may fabricate the host 12 and another vendor may fabricate the storage array 16. Since the SCSI protocol is complex, different vendors generally implement the SCSI protocol differently from one another so that every combination of host-vendor/storage array-vendor is unique in terms of the exact information transferred between the host 12 and the storage array 16. Therefore, whenever a vendor develops a new SAN product that interacts with the host 12 and the storage array 16, the vendor, in order to have a viable and marketable product, invests a considerable amount of effort in validating that the new SAN product is compatible with the other SAN products produced by the other vendors in the SAN.

SUMMARY

In one aspect, a method of testing a device for use in a storage area network (SAN) system includes receiving recorded messages includes messages from a host and from a storage array and messages to a host and to a storage array, sending the recorded messages from the host and from the storage array to a device under test, receiving messages from the device under test in response to the recorded messages sent and determining whether the device under test functions identically to a validated device based on the messages from the device under test being substantially identical to the recorded messages.

In another aspect, an apparatus to test a device for use in a storage area network (SAN) system includes circuitry to receive recorded messages including messages from a host and from a storage array and messages to a host and to a storage array, send the recorded messages from the host and from the storage array to a device under test, receive messages from the device under test in response to the recorded messages sent and determine whether the device under test functions identically to a validated device based on the messages from the device under test being substantially identical to the recorded messages.

In a further aspect, an article includes a machine-readable medium that stores executable instructions to test a device for use in a storage area network (SAN) system. The instructions cause a machine to receive recorded messages including messages from a host and from a storage array and messages to a host and to a storage array, send the recorded messages from the host and from the storage array to a device under test, receive messages from the device under test in response to the recorded messages sent and determine whether the device under test functions identically to a validated device based on the messages from the device under test being substantially identical to the recorded messages.

DETAILED DESCRIPTION

Described herein is an approach to test a device (e.g., a fibre splitter) for use in a storage area network (SAN) that is configured to communicate with a host and a storage array without using actual the host and the storage array in the testing process.

Figure 2:
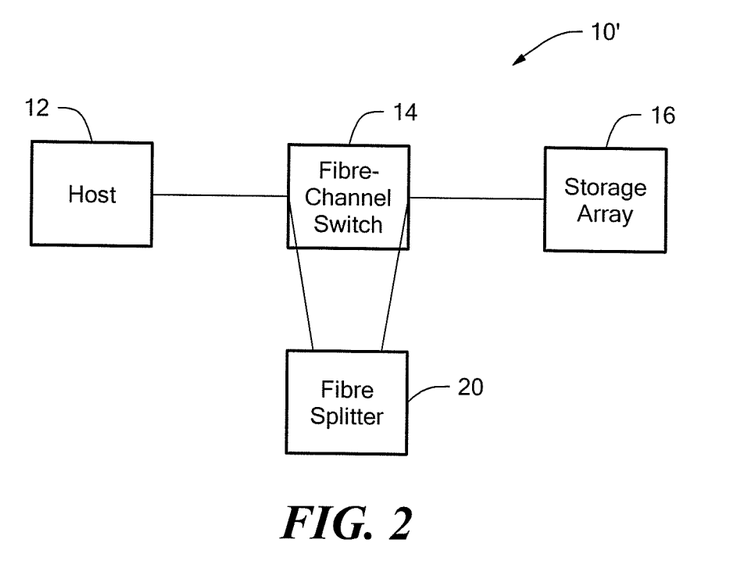
FIG. 2 is an example of the prior art storage-area network (SAN) including a fibre splitter.

Referring to FIG. 2, a prior art storage area network (SAN) 10' includes a host 12 and a storage array 16 coupled together by a fibre channel switch 14. The SAN 10' also includes a fibre splitter 20 coupled to the fibre channel switch 14. The fibre splitter 20 emulates the host 12 and the storage array 16. In particular, the host 12 does not directly access the storage array 16, but rather interacts with the fibre splitter 20 instead so that the fibre splitter 20 becomes a virtual storage array from the perspective of the host 12 being indistinguishable from the storage array 16. Likewise, the storage array 16 does not directly access the host 12, but instead interacts with the fibre splitter 20 so that the fibre splitter 20 becomes a virtual host from the perspective of the storage array 16 being indistinguishable from the host 12. Accordingly, it is the fibre splitter 20 that provides host messages to the storage array 16 and storage array messages to the host 12.

In general, a fibre splitter is required to communicate with multiple vendor combinations of hosts and storage arrays. The structure and content of the messages transferred between the host and the storage array is tightly coupled (due to different interpretations of the SCSI standard by the different vendors) with the exact vendor combination of host type and storage type. The exact nature of the communication may depend on many factors including: vendor of the host hardware, operating system installed on the host, SCSI drivers installed on the host, application running on the host, vendor of the storage array, various configuration parameters applied on the storage array and so forth.

In prior art approaches, whenever a new version of the fabric-splitter was planned to be released, it was necessary to conduct a very long and time consuming testing process including assembling a test suite to ensure sure that the new version of the fibre splitter was compatible (i.e., functioning correctly) with respect to all host/storage array vendor combinations the fabric splitter was designed to support. For example, as part of a test process to validate new versions of the fibre splitter, a testing organization physically set-up many different operating environments containing all the supported vendor combinations of hosts and storage arrays. A quality assurance organization usually conducts a series of tests for each vendor combination, to ensure that the new fibre splitter is compatible with each vendor combination. However, this test process is very expensive in both time and physical resources, because many different types of host and storage arrays were needed to conduct these tests.

Figure 3A:
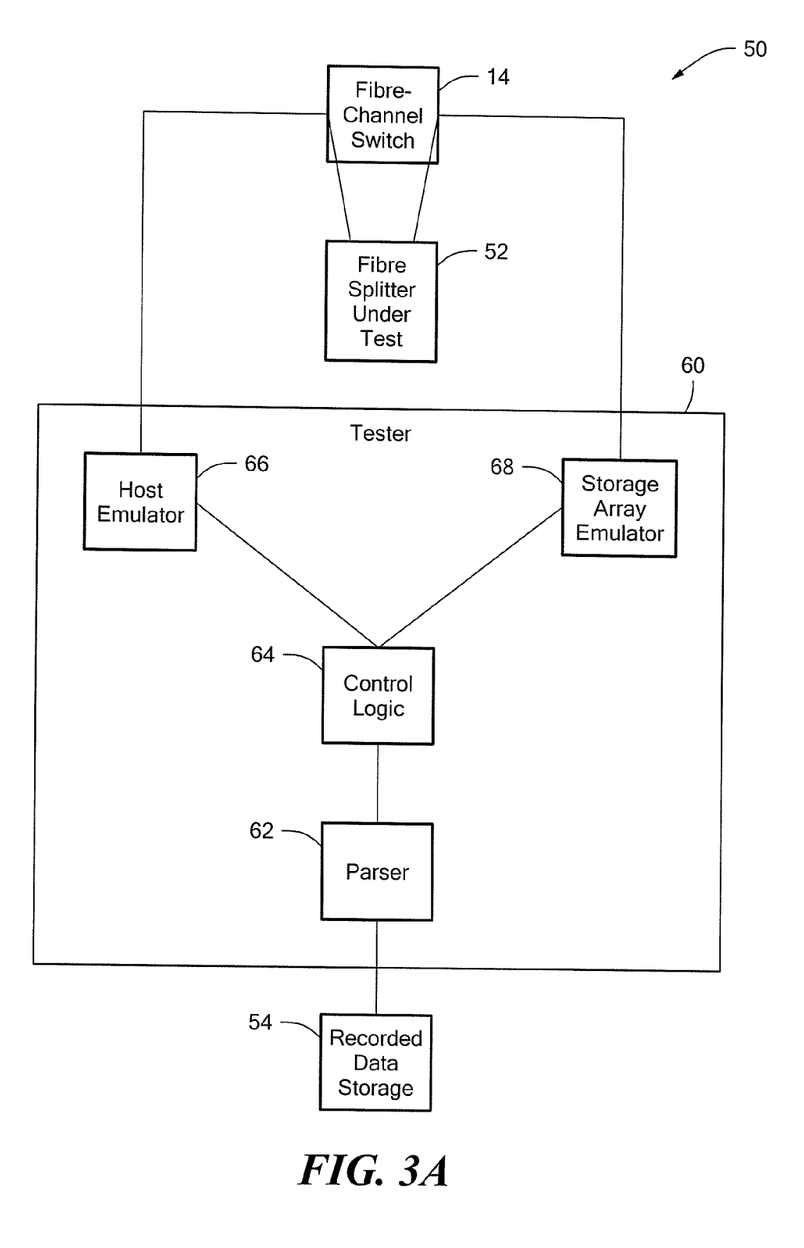
FIG. 3A is a test configuration to test a fibre splitter.

Referring to FIG. 3A, a test configuration 50 includes a fibre splitter under test 52 coupled to the fibre channel 14 and a tester 60 coupled to the fibre channel 14 and a recorded data storage 54. In the test configuration 50, the host 12 and the storage array 16 are not required to be present (e.g., in the same location) in the testing of the fibre splitter under test 52 thereby saving the cost and expense of providing these resources as well as the time involved to configure and deploy the different hosts and storage arrays during testing. Instead, a single tester 60, connected to the fibre splitter under test 52 in the SAN, is used to emulate the host 12 and the storage array 16.

The tester 60 includes a parser 62, a control logic circuit 64, a host emulator 66 and a storage array emulator 68. The recorded data storage 54 provides the parser 62 with recorded messages exchanged between the host 12 and the storage array 16. In particular, the recorded messages include a sequence of messages exchanged between the host 12 and the storage array 16 and the validated fibre splitter. In one example of a message sequence, the host 12 sends a message Q21 to the storage array 16. The storage array 16 responds by sending a message P21 to the host 12. The host 12 sends a message Q22 to the storage array 16 and so forth.

For the recorded messages, the parser 62 parses from the recorded messages host messages sent from the host 12 and storage array messages sent from the storage array 16. The control logic circuit 64 provides the host messages to the host emulator 66 and provides the storage array messages to the storage array emulator 68.

The tester 60 will playback the messages from the host 12 and from the storage array 16 and send them to the fibre splitter under test 52. The tester 60 validates that the messages, provided by the fibre splitter under test 52 in response to the messages it receives, are identical to the recorded messages.

For example, using the example sequence previously described, the host emulator 66 generates a message identical to the message Q21 and sends it to the fabric-splitter under test 52. The tester 60 waits for the fabric-splitter under test 52 to forward an identical message to the message Q21 to the storage array emulator 68. The control logic 64 validates that the message sent from the fibre splitter under test 52 is identical to the messages Q21 sent by the validated fibre splitter. The control logic 64 instructs the host emulator 66 to respond by providing a message identical to the message P22 to the fibre splitter under test 52. The tester 60 waits for the tested fibre splitter 52 to forward the message identical to the message P22 to the host emulator 66. The control logic 64 validates that the message identical to the message P22 from the fibre splitter under test 52 is identical to the message P22 from the validated fibre splitter in the recorded messages.

The tester 60 can validate that a fibre splitter will function properly with respect to the host 12 and storage array 16 by using the recorded messages exchanged between the host and the storage array rather than deploying the actual host and storage array to perform the test. The tester 60 can test many different vendor combinations of hosts and storage arrays during a single test session thereby validating the fibre splitter for these vendor combinations just by having the recorded messages for these vendor combinations.

Figure 3B:
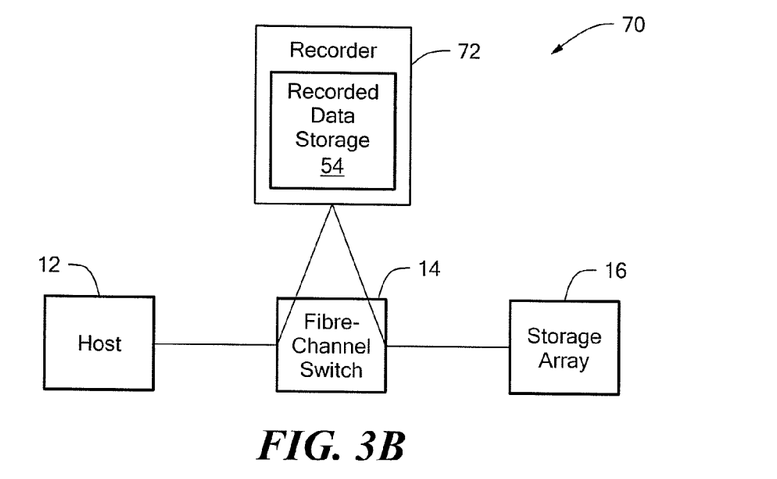
FIG. 3B is a recording configuration used to record messages.

Referring to FIG. 3B, in one example, a recording configuration 70 may be used to obtain the recorded messages. The recording configuration 70 includes a recording device 72 that includes the recorded data storage 54. The recording device 72 is connected to a the fibre channel switch 14 to record the messages sent from the host 12 and the storage array 16 in a successful interaction between the host and the storage array. In one example, the recording can be obtained through standard tracing tools connected into an existing SAN environment and recording all the data frames between the host 12 and the storage array 16. Since the recording requires that a successful interaction between the host and a storage array be captured, the actual recording can take place in any other place or time than during the testing of the fibre splitter under test, for example, or even by a different organization which has access to the specific hardware needed. Moreover, a validated fibre splitter is not needed during the recording sessions since the fibre splitter 20 is transparent to the host 12 and the storage array 16.

Figure 4:
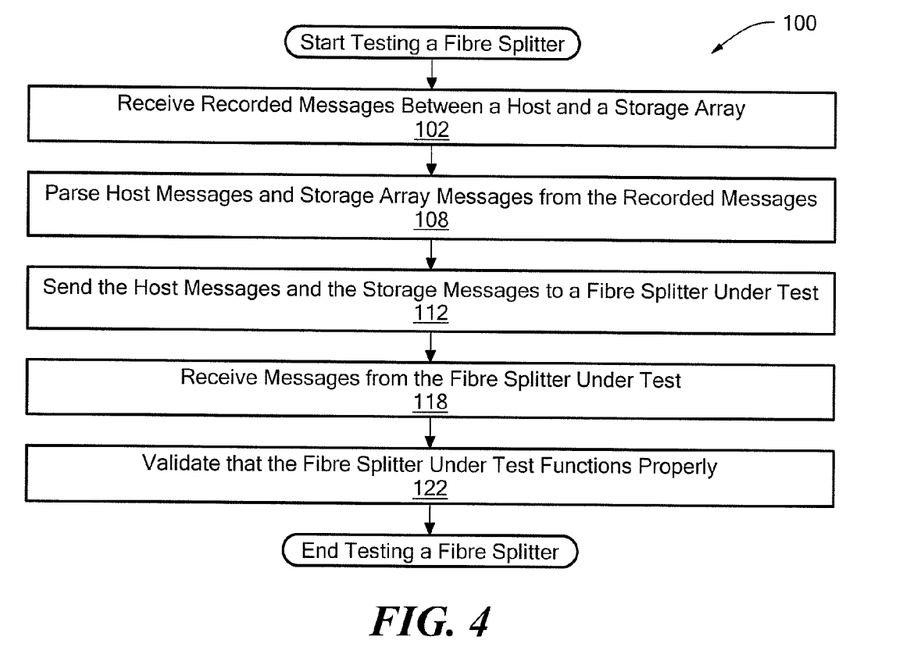
FIG. 4 is a flowchart of a process to test the fibre splitter.

FIG. 4 shows an exemplary process, a process 100 used by a tester 60 to test a fibre splitter. Tester 60 receives recorded messages between the host 12 and the storage array 16 (102). The tester 60 parses host messages and storage array messages from the record message (108). The tester 60 sends the host messages and the storage array messages to a fibre splitter under test 52 (112). For example, the tester 60 uses the host emulator 66 to send host messages and the storage array emulator 68 to send the storage array messages. The tester 60 receives messages from the fibre splitter under test 52 (118), for example, in response to the host messages and storage messages the fibre splitter under test receives. The tester 60 validates that the fibre splitter under test functions identically to a validated fibre splitter (122). For example, the control logic 64 compares the recorded messages received with the messages received from the host 12 and the storage array 16.

While the description thus far focuses on a fibre splitter, any device connected to a SAN may be tested using the techniques described herein. For example, the device may be a device for providing a virtual storage to a host while using several different physical storage arrays for storing the actual data. In another example, the device may be a device for emulating a backup-tape to a host but writing the data to a storage array. In a still further example, the device may be a device for tapping IOs in between a host and a storage array in order to collect and present to a user various statistics. As the fibre splitter represents a special case in that a fibre splitter is transparent to the host and the storage array, FIGS. 5A, 5B and 6 cover a generic device connected to a SAN that is not transparent to the host and the storage array.

Figure 5A:
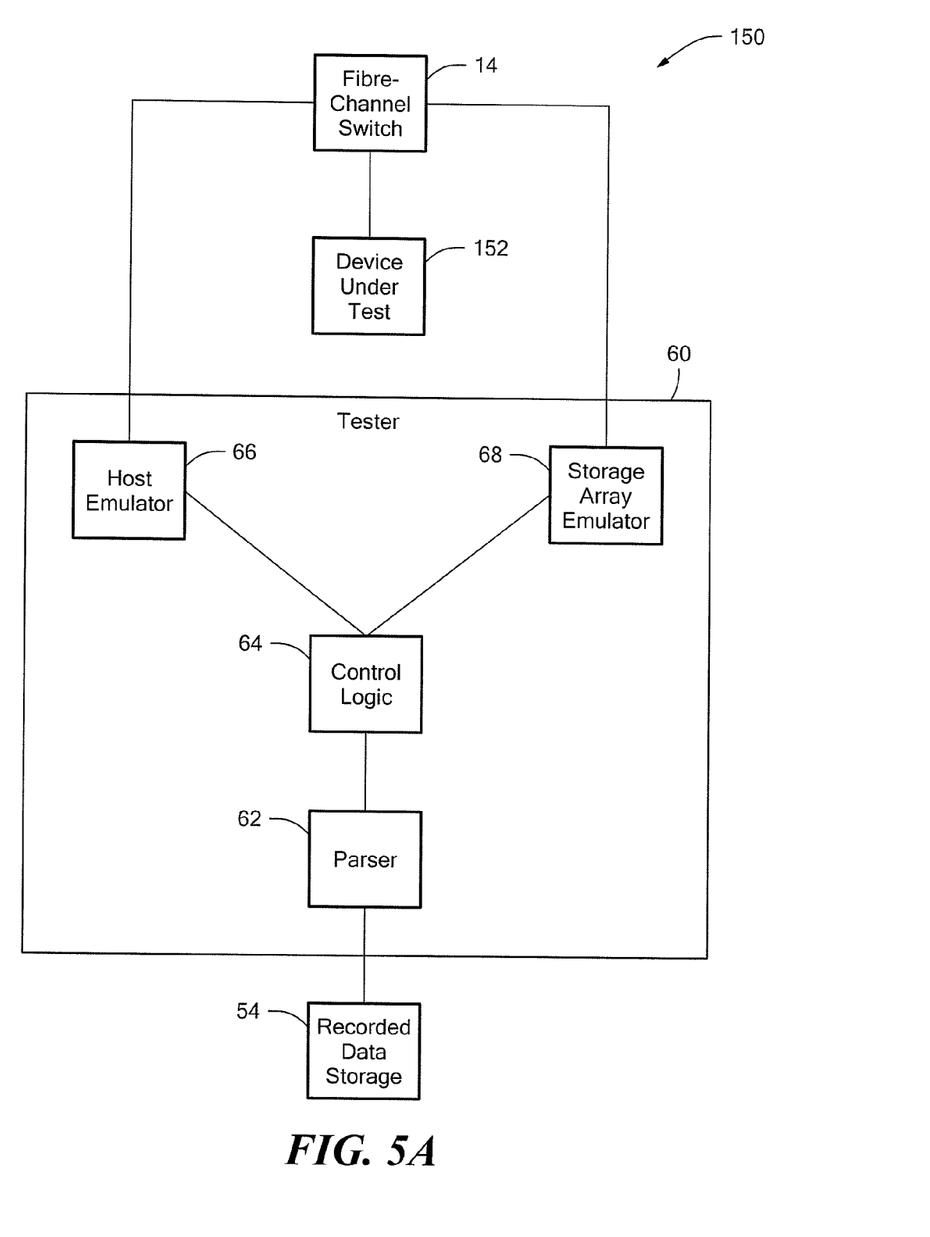
FIG. 5A is a test configuration to test a device.

Referring to FIG. 5A, a test configuration 150 includes a device under test 152 coupled to the fibre channel 14 and a tester 60 coupled to the fibre channel 14 and a recorded data storage 54. In the test configuration 150, the recorded data storage 54 provides the parser 62 with recorded messages exchanged between the host 12 and the storage array 16 and a validated device (e.g., a validated device 190 in FIG. 5B). In particular, the recorded messages include a sequence of messages exchanged between the host 12 and the validated device 190 and between the storage array 16 and the validated device.

The host emulator 66 emulates the recorded messages from the host 12 to the validated device 190 (host messages) and sends the emulated host messages to the device under test 152. The storage array emulator 68 emulates the recorded messages from the storage array 16 to the validate device 190 (storage array messages) and sends the emulated storage array messages to the device under test 152. The control logic 64 validates that the messages sent from the device under test 152 in response to the host messages and the storage array messages are identical to the messages recorded sent from the validated device 190.

Figure 5B:
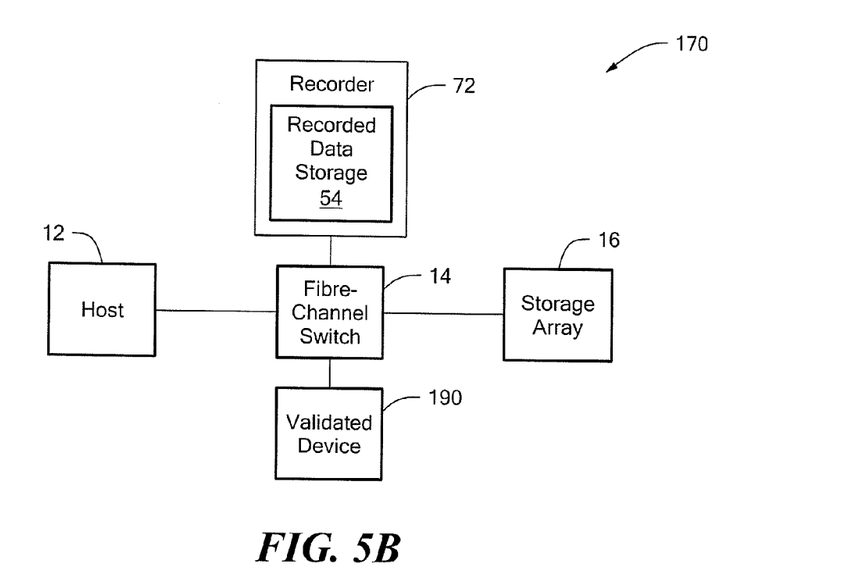
FIG. 5B is a recording configuration used to record messages from a validated device.

Referring to FIG. 5B, in one example, a recording configuration 170 may be used to obtain the recorded messages from a validated device 190. The recording device 72 is connected to the validated device 190 to record the messages between the host 12 and the validated device 190 and between the storage array 16 and the validated device 190.

Figure 6:
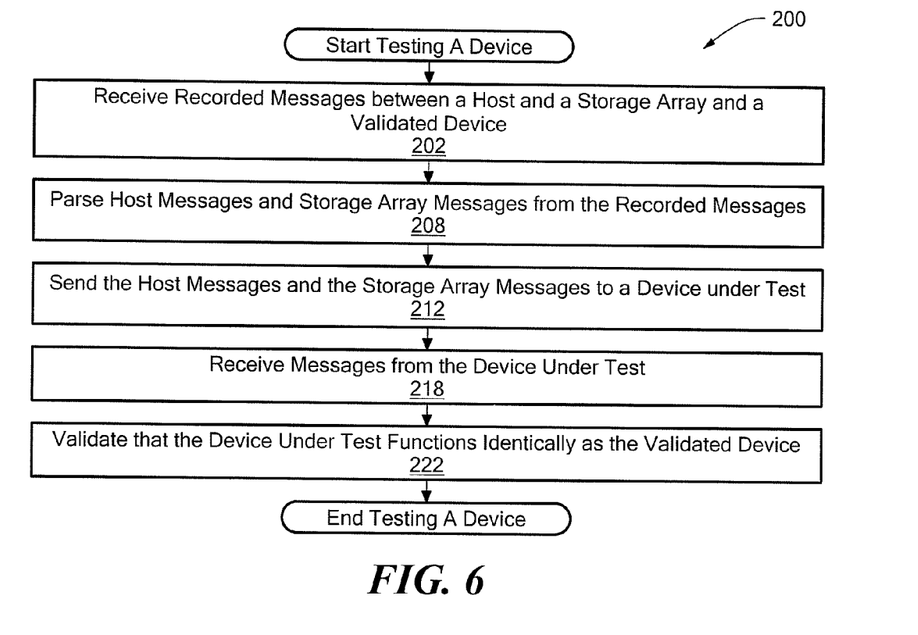
FIG. 6 is a flowchart of a process to test the device.

FIG. 6 shows an exemplary process, a process 200 used by a tester 60 to test the device under test 152. Tester 60 receives recorded messages between the host 12 and the storage array 16 and the validated device 190 (202). The tester 60 parses host messages and storage array messages from the record message (208). The tester 60 sends the host messages and the storage array messages to the device under test 152 (212). For example, the tester 60 uses the host emulator 66 to send host messages and the storage array emulator 68 to send the storage array messages. The tester 60 receives messages from the device under test 152 (218), for example, in response to the host messages and storage messages the device under test 152. The tester 60 validates that the device under test functions identically as the validate device (222). For example, the control logic 64 compares the messages received from the validated device 190 with the messages received from the device under test 152.

Figure 7:
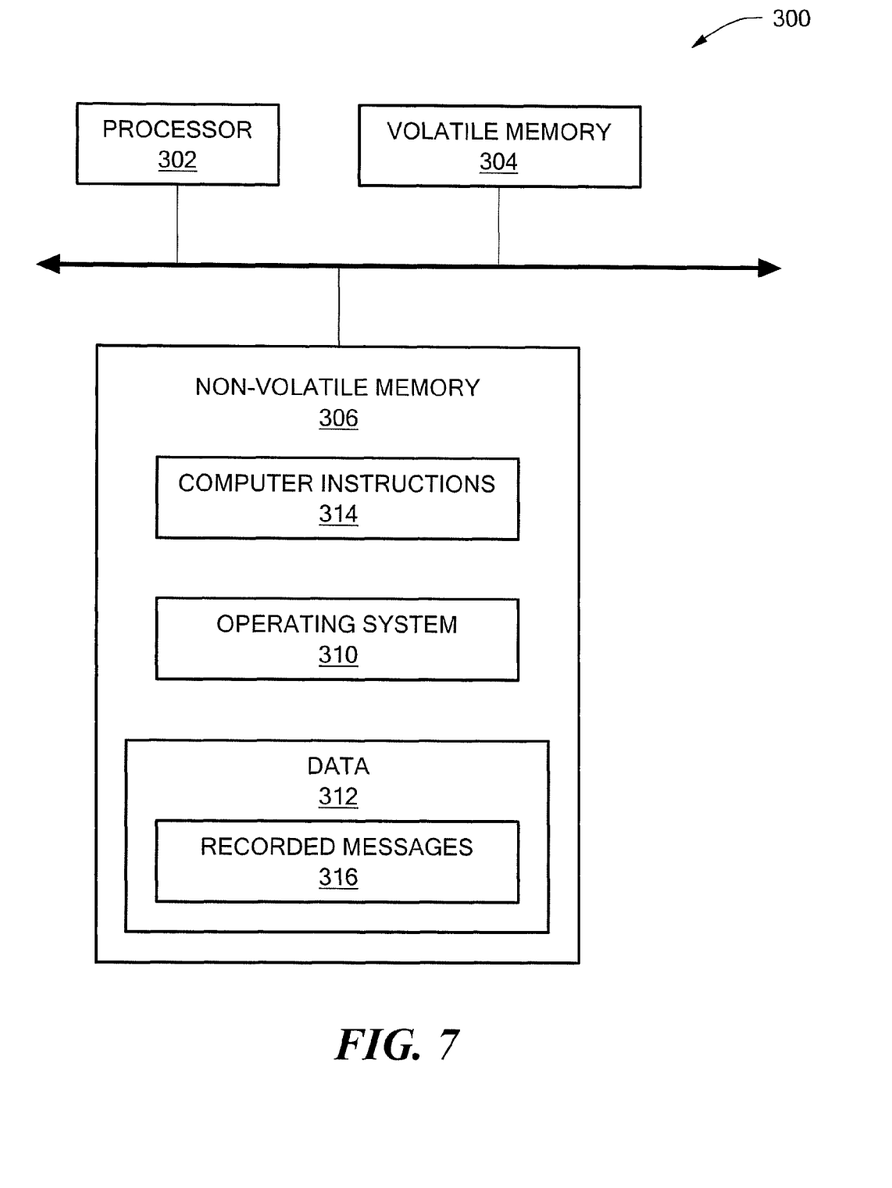
FIG. 7 is a computer on which the processes of FIG. 4 or FIG. 6 may be implemented.

FIG. 7 shows an example of a computer 300, which may be used to execute all or part of processes 100 or 200. Computer 300 includes a processor 302, a volatile memory 304 and a non-volatile memory 306 (e.g., hard disk). Non-volatile memory 306 includes an operating system 310, data 312 including recorded messages 316, and computer instructions 314 which are executed out of volatile memory 304 to perform processes 100 or 200 or portions of processes 100 or 200.

The processes described herein (e.g., process 100 and 200) are not limited to use with the hardware and software of FIG. 7; they may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 100 or process 200 and to generate output information.

The system may be implemented, at least in part, via a computer program product, (e.g., in a machine-readable storage device, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 100 or process 200. The processes may also be implemented as a machine-readable storage medium, configured with a computer program, where upon execution, instructions in the computer program cause the computer to operate in accordance with processes 100 or 200.

The processes described herein are not limited to the specific embodiments described herein. For example, the processes are not limited to the specific processing order of the processing blocks in FIGS. 4 and 6. Rather, any of the processing blocks of FIGS. 4 and 6 may be re-ordered, combined or removed, performed in parallel or in serial, as necessary, to achieve the results set forth above.

The system described herein is not limited to use with the hardware and software described above. The system may be implemented in digital electronic circuitry, or in computer hardware, firmware, software, or in combinations thereof.

Processing blocks in FIGS. 4 and 6 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A method of testing a device for use in a storage area network (SAN) system, comprising:
   receiving recorded messages comprising messages from a host and from a storage array and messages to the host and to the storage array, the host and the storage array being coupled to a validated device in the SAN system, the recorded messages being recorded prior to sending the recorded messages to a device under test;
   sending the recorded messages from the host and from the storage array to the device under test;
   receiving messages from the device under test in response to the recorded messages sent; and
   determining whether the device under test functions identically to the validated device based on the messages from the device under test being substantially identical to the recorded messages.

2. The method of claim 1, further comprising:
   parsing host messages and storage array messages from the recorded messages;
   providing the storage array messages to a storage array emulator; and
   providing the host messages to a host emulator.

3. The method of claim 2 wherein sending the recorded messages to a device under test comprises:
sending the host messages from the host emulator to the device under test; and
sending the storage array messages from the storage emulator to the device under test.

4. The method of claim 1 wherein sending the recorded messages to a device under test comprises sending the recorded messages to a fibre splitter.

5. The method of claim 1, further comprising:
recording messages between the host and the validated device and between the storage array and the validated device to form at least a portion of the recorded messages.

6. The method of claim 1, further comprising receiving recording messages comprising messages from a plurality of hosts and from a plurality of storage arrays.

7. The method of claim 6 wherein receiving recording messages comprising messages from a plurality of hosts and from a plurality of storage arrays comprises receiving recording messages from a plurality of hosts comprising at least two hosts fabricated by different vendors and from a plurality of storage arrays comprising at least two storage arrays fabricated by different vendors.

8. The method of claim 1 wherein receiving recorded messages comprising messages from a host and from a storage array and messages to a host and to a storage array comprises receiving recorded messages comprising messages from a host fabricated by a first vendor and from a storage array fabricated by a second vendor.

9. An apparatus to test a device for use in a storage area network (SAN) system, comprising:
circuitry to:
receive recorded messages comprising messages from a host and from a storage array and messages to a host and to a storage array, the host and the storage array being coupled to a validated device in the SAN system, the recorded messages being recorded prior to sending the recorded messages to a device under test;
send the recorded messages from the host and from the storage array to the device under test;
receive messages from the device under test in response to the recorded messages sent; and
determine whether the device under test functions identically to the validated device based on the messages from the device under test being substantially identical to the recorded messages.

10. The apparatus of claim 9 wherein the circuitry comprises at least one of a processor, a memory, programmable logic and logic gates.

11. The apparatus of claim 9, further comprising circuitry to:
parse host messages and storage array messages from the recorded messages;
provide the storage array messages to a storage array emulator; and
provide the host messages to a host emulator,
wherein circuitry to send the recorded messages to a device under test comprises circuitry to:
send the host messages from the host emulator to the device under test; and
send the storage array messages from the storage emulator to the device under test.

12. The apparatus of claim 9 wherein circuitry to send the recorded messages to a device under test comprises circuitry to send the recorded messages to a fibre splitter.

13. The apparatus of claim 9, further comprising circuitry to:
record messages between the host and the validated device and between the storage array and the validated device to form at least a portion of the recorded messages.

14. The apparatus of claim 9, further comprising circuitry to receive recording messages comprising messages from a plurality of hosts and from a plurality of storage arrays,
wherein circuitry to receive recording messages comprising messages from a plurality of hosts and from a plurality of storage arrays comprises circuitry to receive recording messages from a plurality of hosts comprising at least two hosts fabricated by different vendors and from a plurality of storage arrays comprising at least two storage arrays fabricated by different vendors.

15. The apparatus of claim 9 wherein circuitry to receive recorded messages comprising messages from a host and from a storage array and messages to a host and to a storage array comprises circuitry to receive recorded messages comprising messages from a host fabricated by a first vendor and from a storage array fabricated by a second vendor.

16. An article comprising a non-transitory machine-readable medium that stores executable instructions to test a device for use in a storage area network (SAN) system, the instructions causing a machine to:
receive recorded messages comprising messages from a host and from a storage array and messages to a host and to a storage array, the host and the storage array being coupled to a validated device in the SAN system, the recorded messages being recorded prior to sending the recorded messages to a device under test;
send the recorded messages from the host and from the storage array to the device under test;
receive messages from the device under test in response to the recorded messages sent; and
determine whether the device under test functions identically to the validated device based on the messages from the device under test being substantially identical to the recorded messages.

17. The article of claim 16, further comprising instructions causing the machine to:
parse host messages and storage array messages from the recorded messages;
provide the storage array messages to a storage array emulator; and
provide the host messages to a host emulator,
wherein the instructions causing the machine to send the recorded messages to a device under test comprises instructions causing the machine to:
send the host messages from the host emulator to the device under test; and
send the storage array messages from the storage emulator to the device under test.

18. The article of claim 16 wherein the instructions causing the machine to send the recorded messages to a device under test comprises instructions causing the machine to send the recorded messages to a fibre splitter.

19. The article of claim 16, further comprising instructions causing the machine to:
record messages between the host and the validated device and between the storage array and the validated device to form at least a portion of the recorded messages.

20. The article of claim 16, further comprising instructions causing the machine to receive recording messages comprising messages from a plurality of hosts and from a plurality of storage arrays, wherein the instructions causing the machine to receive recording messages comprising messages from a plurality of hosts and from a plurality of storage arrays comprises instructions causing the machine to receive recording messages from a plurality of hosts comprising at least two hosts fabricated by different vendors and from a plurality of storage arrays comprising at least two storage arrays fabricated by different vendors.

* * * * *